United States Patent Office 3,350,344
Patented Oct. 31, 1967

3,350,344
ORGANOSILICON COMPOSITIONS
Melvin D. Beers, Latham, N.Y., assignor to General Electric Company, a corporation of New York
No Drawing. Filed Sept. 18, 1963, Ser. No. 309,888
5 Claims. (Cl. 260—37)

The present invention relates to resilient deformable organosilicon compositions and to a method for making them.

Various methods are known for making resilient deformable products commonly referred to as "bouncing putty" resulting from the reaction of organosiloxane with a boron-oxygen compound. For example, Wright Patent 2,541,851, assigned to the same assignee as the present invention, shows that a resilient deformable organosilicon putty can be made by heating a mixture of a dimethylsilicone oil, an alkyl borate, and ferric chloride, and blending the resulting polymer with a filler, and optionally with various other ingredients, such as glycerine, etc. Although putty made in accordance with such methods possesses many valuable properties, it is well known that it will stain if placed in contact with clothing, furniture, etc. for a relatively short period of time. Such putty also has a tendency to flow, or assume the shape of its container. It would be desirable therefore to be able to make a bouncing putty in an easy and direct manner which resists staining fabrics as well as remain stable in shape over an extended period of time.

The present invention is based on the discovery that unexpected results are achieved if the reaction product of organosiloxane, boron-oxygen compound and catalyst is treated with an ammonium salt of carbonic acid before it is utilized in making putty. A resilient putty is made which retains its shape for an extended period of time and resists staining fabrics.

In accordance with the practice of the invention, there is provided a method for making resilient deformable organosilicon materials, which comprises milling a mixture comprising (A) 100 parts of organosilicon polymer, and (B) 3 to 100 parts of a silica filler, where said organosilicon polymer is the product produced by (1) heating to a temperature between 40° C. to 250° C., a mixture comprising (a) 100 parts of organosiloxane having the formula (1)  $(R)_a SiO_{(4-a)/2}$ (b) .01 to 5 parts of boron in the form of a boron-oxygen compound, (c) a Lewis acid catalyst, and (2) uniformly dispersing in the resulting product of (1), at temperatures up to 250° C., an amount of ammonium salt of carbonic acid sufficient to neutralize acid residues of said Lewis acid catalyst, where R is a member selected from monovalent hydrocarbon radicals, and halogenated monovalent hydrocarbon radicals, and $a$ is equal to from 1.85 to 2.2 inclusive.

R of Formula 1 can be the same or different radical, and is a member selected from a monovalent alkyl radical such as methyl, ethyl, propyl, etc.; a monovalent aryl radical or haloaryl radical such as phenyl, chlorophenyl, etc.; monovalent alkenyl radicals such as vinyl, allyl, etc., and mixtures of such radicals.

The organosiloxane of Formula 1 includes polymethylsiloxanes which are more particularly shown in Silicones, by Robert N. Meals and Frederick M. Lewis, Rheinhold Publishing Corp. (1959), on pages 16 to 34. For example, included by Formula 1, are poly(dimethylsiloxy) fluids having a viscosity at 25° C. of from 50 centipoises or below to 100,000 centipoises or higher, methylcyclopolysiloxanes such as octamethylcyclotetrasiloxane, polymethylsiloxane composed of chemically combined units such as trimethylsiloxy, dimethylsiloxy, methylsiloxy; organosiloxane composed of one or more of the aforementioned methylsiloxy units, with dimethylvinylsiloxy units, phenylsiloxy units such as diphenylsiloxy, phenylsiloxy, methylphenylsiloxy, etc.

The boron-oxygen-compounds that can be employed to produce the putty-like materials of the present invention preferably include for example, boron oxides such as pyroboric acid ($H_2B_4O_7$), boron oxide ($B_2O_3$) etc. These boron oxides are preferably utilized in amounts to provide for a proportion of from 0.1 to 3 parts of boron per 100 parts of organosiloxane. In addition, organo borates having the formula (2) 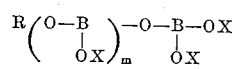

and cyclic esters (3) 

also can be employed, where $m$ is a whole number equal to from 0 to 3, $y$ is an integer equal to from 3 to 5, R is defined above, and X is a member selected from the class of hydrogen and R.

Specific examples of the organo borates of Formula 2 are triphenylborate, trimethylborate, etc. A specific example of a borate ester within the scope of Formula 3 is trimethoxyboroxine.

The silica fillers that have been found to be operable in the present invention are finely divided powders having a particle size in the range of .01 to 50 microns. These fillers can be made by precipitation, aerosol-aerogel methods, vapor phase burning of silicon tetrachloride or ethyl silicate, or by such means as mechanical attrition of quartz. According to the method of manufacture, the silica fillers can contain hydroxyl radicals or alkoxy radicals bound to silicon atoms. Examples of such silica fillers are described in U.S. Patents 2,541,137, 2,610,167 and 2,657,149.

The polymerization catalysts that can be utilized to form the organosiloxane polymer of the invention include well known Lewis acid catalysts such as ferric chloride, which is preferred, aluminum chloride, sulphuric acid, boron trichloride, etc. These catalysts are characterized in that they can effect polymerization by utilizing electron pairs from other materials to complete their own electron shells. The catalyst can be employed at from .01 to 10 percent, and preferably from 0.1 to 1 percent by weight of the organosiloxane.

The term "milling" used in the description of the present invention refers to the use of standard rubber equipment such as a rubber mill, doughmixer, Waring Blendor, etc., that can be employed to agitate, mix, blend, etc. the polymer with the filler, pigments, etc.

In the practice of the invention, the organosilicon polymer is made by heating a mixture of organosiloxane, boron-oxygen-compound and catalyst; the resulting organosiloxane reaction product is treated with an ammonium salt of carbonic acid. The organosilicon polymer is then milled with a silica filler.

In forming the organosiloxane reaction product, the order of addition of the respective components is not critical. A preferred procedure is to add the boron-oxygen-compound to the organosiloxane followed by the addition of the catalyst. While the resulting mixture is agitated, such as doughmixed, etc. a temperature between about 40° C. to 250° C. can be utilized and preferably 120° C. to about 170° C. Depending upon such factors as the duration and intensity of milling, the temperature utilized, amount of catalyst, etc.; the time required for making the organosiloxane reaction product can vary from one hour or less, to several hours or more.

The organosiloxane reaction product can be treated by milling it with an ammonium salt of carbonic acid. Although ammonium carbonate is preferred, ammonium bicarbonate also can be employed. Preferably, an amount of ammonium salt of carbonic acid is used sufficient to provide at least an equivalence of catalyst employed. The temperature at which the organosiloxane reaction product is treated can be at room temperature, or below, by milling on a rubber mill, or temperatures up to 250° C., can be utilized if desired. Preferably a temperature of up to about 170° C., such as between 110° C. to about 170° C. is employed.

The putty is made by milling the organosilicon polymer with silica filler. In addition to the silica filler, the putty can be modified with pigments, softeners, etc., including such materials as iron oxide, titanox, glycerine, ferric stearate, oleic acid, etc. The order of addition of the various modifying ingredients to the treated polymer is not critical. Depending upon the softness, rebound, etc. and other properties desired in the putty, the various materials can be employed over wide weight proportions.

In order that those skilled in the art will be better able to practice the invention, the following examples are given by way of illustration and not by way of limitation. All parts are by weight.

*Example 1*

There were added at a temperature of 60° C., 5.0 parts of boric oxide to 100 parts of an organosiloxane composed of about 99.5 mole percent of dimethylsiloxy units, and about 0.5 mole percent of methylsiloxy units. The mixture was continuously stirred and heated to a temperature of about 80° C., 0.3 part of anhydrous ferric chloride was added. The batch was then cooked for a period of about 2½ to 3 hours at a temperature between 130° C. to 170° C. There were slowly added to the resulting mixture, 6.0 parts of powdered ammonium carbonate while maintaining the temperature between 130° C. to 160° C. The mixture was heated until all of the gases formed during the reaction were released.

To the resulting polymer there were added at a temperature below about 80° C., about 6 parts of ferric stearate per 100 parts of polymer. The mixture was milled and about 4 parts of glycerine were added. In addition, there were added about 15 parts of a precipitated silica and milling was continued until a uniform putty was formed.

Samples of putty were exposed to moisture under sealed conditions at 25° C. Samples of putty made from organosiloxane reaction products following the same procedure, without treatment with ammonium carbonate were also tested under the same conditions. Some of the putty samples were exposed for seven days and some were exposed for ninety days. The samples then were worked by hand, and allowed to rest on a fabric for 48 hours. A stain, discoloration, or any residue of the putty on the fabric after the putty was removed, failed the stain test. The data below show the results of the stain test, where treated polymer indicates putty made by the practice of the invention.

|  | Stain | |
| --- | --- | --- |
|  | 7 Days | 90 Days |
| Treated Polymer | No | No |
| Control | Yes | |

Small balls were made from the putty and allowed to rest upon a flat substrate for a period of 2 months. It was found that balls made from putty made from treated polymer, did not change in shape. The balls made from the control putty flowed considerably. These balls had flattened and were surrounded by a pool of putty. Samples of both putties were then worked manually. The samples were formed into balls. There were no differences found when the balls were examined. Both samples exhibited about the same rebound and other valuable characteristics of bouncing putty. However, the putty made from the treated polymer passed the stain test after 48 hours; the control putty left stain on the fabric following the same procedure.

Based upon the above results, one skilled in the art would know that the putty made in accordance with the present invention possesses many unique properties not present in the putty made in accordance with prior art methods. The putty of the present invention for example, retains its shape over an extended period of time. After it has been exposed to moisture for an extended period of time it can be safely placed in contact with a fabric.

While the foregoing example has been limited to only a few of the very many variables within the scope of the present invention, it should be understood that the present invention is directed to the production of a much broader class of organosilicon compositions which can be made by treating the product of reaction of a organosiloxane, a boron-oxygen compound, and a Lewis acid catalyst, with an ammonium salt of carbonic acid and then milling the resulting treated polymer with a filler.

What I claim as new and desire to secure by Letters Patent of the United States is:

1. A method which comprises (1) heating to a temperature between 40° C. to 250° C. in the presence of an effective amount of a Lewis acid catalyst, a mixture comprising by weight (A) 100 parts of an organosiloxane of the formula, $$(R)_a SiO_{(4-a)/2}$$

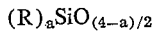

and (B) 0.01 to 5 parts of boron in the form of a boron-oxygen compound, (2) uniformly mixing with the product of (1) at temperatures up to 250° C., an amount of an ammonium salt of carbonic acid which is at least sufficient to neutralize any acid residues of said Lewis acid catalyst, while providing for the removal of any volatile reaction products from the resulting organosilicon polymer, and (3) mixing together the organosilicon polymer with a filler, said filler being present in amounts of 0.03 to 1 part by weight per part of the polymer, where R is a member selected from the class consisting of monovalent hydrocarbon radicals and halogenated monovalent hydrocarbon radicals, and $a$ is equal to from 1.85 to 2.2, inclusive.

2. A method in accordance with claim 1, which comprises (1) heating to a temperature between 40° C. to 250° C., in the presence of an effective amount of ferric chloride, a mixture comprising by weight (A) 100 parts of methylsiloxane consisting essentially of chemically combined dimethylsiloxy units, and (B) 0.1 to 3 parts of boron in the form of a boron-oxide, (2) uniformly mixing with the product of (1) at temperatures up to 250° C. an amount of ammonium carbonate sufficient to neutralize any acid residues of ferric chloride, while providing for the removal of any volatile reaction products from the resulting organosilicon polymer, and (3) mixing together the organosilicon polymer with a silica filler, said filler being present in amounts of 0.03 to 1 part by weight per part of the polymer.

3. The method of claim 1 in which the boron-oxygen compound is boric oxide.

4. The method of claim 1 in which the Lewis acid catalyst is ferric chloride.

5. The method of claim 1 in which the filler is silica filler.

(References on following page)

References Cited

UNITED STATES PATENTS

| | | | |
|---|---|---|---|
| 2,596,085 | 5/1952 | Wormuth | 260—37 |
| 3,031,366 | 4/1962 | Bueche et al. | 260—37 |
| 3,177,176 | 4/1965 | Boot et al. | 260—37 |

OTHER REFERENCES

S. Fordham, "Silicones," George Newnes Ltd., London, 1960. Call No. TP 248 S5F6. Pp. 130, 131, 132, 135, 136, 140 relied upon. Copy available in Scientific Library.

C. Eaborn, "Organosilicon Compounds," Butterworths Scientific Publications, 1960. Call No. QD 412 S6E2. Pp. 228, 229, 237, 238, 239, 323, 324 relied upon.

MORRIS LIEBMAN, *Primary Examiner.*

J. E. CALLAGHAN, *Assistant Examiner.*